United States Patent Office 3,668,019
Patented June 6, 1972

3,668,019
ALUMINUM ELECTRICAL CONDUCTOR WIRE
Harold Y. Hunsicker, Lower Burrell, Pa., assignor to Aluminum Company of America, Pittsburgh, Pa.
No Drawing. Filed Dec. 30, 1969, Ser. No. 889,313
Int. Cl. C22c 21/00; C22f 1/04
U.S. Cl. 148—11.5 A
8 Claims

ABSTRACT OF THE DISCLOSURE

Electrical conductor wire in a strain-hardened condition suited for use in stranded conductors for above-ground power transmission and composed of an aluminum base alloy containing 0.04 to 0.3% magnesium and up to 0.5% copper, the balance being aluminum with certain maximum limits on other elements and impurities. This wire and stranded conductor produced therefrom exhibits a highly useful combination of conductivity, strength and resistance to creep.

BACKGROUND OF THE INVENTION

It is known that aluminum and, in some instances, certain of its alloys, is highly suited for use as above-ground electrical power transmission lines because of its strength, good electrical conductivity and its light weight. Factors of major importance in selecting an aluminum metal for this application are electrical conductivity, strength and resistance to relatively low temperature creep. Electrical conductivity is important for the obvious reason that with a metal having high conductivity, a smaller wire can be used to carry a given electrical load or a wire of given size can carry a greater load thus realizing an economy.

The value of high strength in the wire used for conductors of high voltage overhead power transmission lines is also apparent. As the strength of the conductor increases, the lines can be installed with higher initial tension and less initial sag, permitting the use of fewer or shorter towers. For many years the strength of stranded aluminum conductors has been increased by employing high strength steel wire strands in various proportions to the aluminum conductor strands. Alternatively, aluminum alloys having relatively high strength may be employed, either in cables stranded entirely of wire of a single composition or as a composite of wires differing in composition and having different strengths and electrical conductivity values.

An aluminum metal with improved creep resistance is very advantageous in construction of high voltage overhead power transmission lines since this permits further economies in the construction of the towers which support the lines. Aluminum wires and conductor cable stranded therefrom tend to creep with the passage of time so that they sag or droop more than when originally installed. This creep occurs not only with conductor cables composed entirely of aluminum or alloys of aluminum but also with those that include steel wires for additional strengthening. To provide a given clearance from ground level after a period of years following installation of the line, an allowance must be made for the creep which will occur. This allowance effectively decreases the spacing or increases the height of the transmission towers. Accordingly, a material with significantly decreased creep facilitates the use of shorter towers or a wider spacing between towers while still assuring the specified minimum clearance from ground level to mid-span transmission line height.

The most common aluminum material employed in transmission lines is substantially pure aluminum, containing a minimum of 99.45% aluminum. This material is referred to as Alloy EC (for electrical conductor). EC wire typically exhibits an electrical conductivity level of 62.5% of the International Annealed Copper Standard (IACS). While this is a desirable conductivity level, EC wire or cable is marked by a fairly high creep level typically approaching 1500 microinches per inch of cable length after 10 years at a stress of 10 k.s.i. Throughout this description, by the way, reference to electrical conductivity will be made as a percentage of IACS and to creep in terms of microinches of creep or growth per inch of wire length after 10 years at a stress of 10 k.s.i. These are accepted standards and their use facilitates accurate comparison of different aluminum conductor wire materials. Aluminum electrical conductor wire is often furnished in a severely strain-hardened temper, commonly designated the H19 temper, which temper is normally imparted by cold reductions in producing the wire. In this temper, the wire has increased strength which varies with the wire size since smaller size wires normally have more strain hardening effects than larger sizes. For illustration, EC wire of about 0.25 inch diameter has a tensile strength of about 24,000 p.s.i. whereas wire of about 0.065 inch diameter would have a higher tensile strength, about 29,000 p.s.i.

In addition to EC wire, another known composition for aluminum alloy conductor is aluminum alloy 5005 which contains 0.5 to 1.1% magnesium. While this wire exhibits substantially improved resistance to creep, typically around 700 microinches, its lower conductivity of only 55.4% is a disadvantage. Another example is alloy 6201 containing, nominally, 0.8% Mg and 0.7% Si, which can be heat treated, cold worked and aged to provide very good strength properties but has a conductivity of only 53%.

Various other aluminum compositions have been proposed and utilized, some of the heat treatable variety and some including expensive, rare or so-called exotic alloy additions. These also are marked by disadvantages and can become quite expensive.

DESCRIPTION OF THE PREFERRED EMBODIMENT

The electrical conductor wire contemplated by the invention normally ranges from about 0.060 to 0.260 inch in thickness, or diameter in the case of round conductor wire which is the most common form. The wire should be in the H19 temper, that is, a severely strain-hardened temper. This temper is imparted by the working operations employed in forming the wire to its final gauge without any annealing treatments or the like to soften the temper. A portion of the total effective strain-hardening is imparted during the operation of rolling the ingot to a diameter of about ⅜ inch to form a product generally referred to as redraw rod. By appropriately cooling the material between stands of a continuous tandem rolling mill, effective cold work equivalent to as much as 60% cold reduction can be imparted in the rolled redraw rod. Further cold working by drawing progressively through a series of dies having gradually diminishing hole sizes adds additional strain hardening. The accumulated strain-hardening from the controlled temperature rolling and drawing is generally at least equivalent in terms of microstructure and strength to that obtained from a 90% reduction in cross sectional area performed cold. The tensile strength of wire in this condition is at least twice the strength of annealed wire. By a cold reduction of 90% is meant that material would be cold reduced by 90% of its cross sectional area before the reduction.

Production of wire in accordance with the invention contemplates providing an ingot which may be continuously cast by a process requiring cooling by direct water application. The ingot is reheated to a temperature of 600°–800° F. prior to entry into the rolling mill but is cooled between stands of the mill to effect the strain-hardening described in the previous paragraph. The redraw rod produced by rolling is then cold drawn down to final wire gauge size. As mentioned above, the combination of rolling under controlled temperature conditions plus the cold drawing operation imparts the desired strain-hardened temper and the wire is normally not annealed either before or subsequent to the drawing operation.

The specific aluminum alloy composition employed in practicing the invention consists essentially of 0.04 to 0.3% magnesium, and up to 0.5% copper, the balance being aluminum with the following maximum limits on other elements and impurities: 0.25% iron, 0.10% silicon, 0.04% boron, 0.04% gallium, 0.03% zinc, 0.01% tin, 0.01% nickel, 0.005% manganese, 0.005% chromium, 0.003% titanium, 0.003% vanadium and 0.003% zirconium. Other impurities must be limited to 0.01% maximum each and a combined total of 0.03% maximum. Furthermore, the total of all elements other than aluminum, magnesium and copper, including those listed along with others not listed above, must be limited to 0.4% maximum.

Aluminum conductor wire of this composition will exhibit a minimum electrical conductivity level of 58.5%, a tensile strength higher than EC wire and a maximum creep level of 1100 microinches. This represents a substantial improvement in conductivity over the 5005 wire along with a substantial improvement in creep resistance over EC wire. Within the basic teaching of the invention, two highly useful embodiments are contemplated. The first exhibits very high electrical conductivity along with a substantial increase in creep resistance over EC alloy. In this embodiment, the basic composition set forth above is altered by limiting copper to an amount of up to 0.05%. This imparts to the conductor wire a minimum electrical conductivity of 59.5% IACS together with the above-mentioned maximum creep of 1100 microinches.

The second embodiment features a substantial improvement in creep resistance over both EC and 5005 alloys along with a substantial improvement in electrical conductivity over the 5005 alloy. This embodiment contemplates the following composition limits over and above those set out earlier as the basic composition. The copper content ranges from 0.2 to 0.5% and the magnesium content ranges from 0.04 to 0.25%. The copper and magnesium contents are further related in that the ratio of percent Cu/% Mg ranges from 1 to 5 and the percent Mg plus 0.5 times the percent Cu is not greater than 0.37 percent. In addition, the impurities, manganese and chromium, are limited to 0.003% each. This embodiment features a minimum electrical conductivity of 58.5% along with a maximum creep of only 600 microinches and is typically even lower, around 470 to 490 microinches.

In addition to the advantages discussed above, the improved wire exhibits greatly enhanced conductance over EC wire in electrical connections such that it maintains a lower and much more stable resistance in such connections.

In order to demonstrate the practice of the invention and the advantages achieved thereby, several wire compositions were compared. Each composition, except those for Examples 19, 20 and 21, was fabricated as described earlier into wire .149 inch in diameter. For Examples 19 to 21 the wire diameter was 0.080 inch. All the wire was in the severely strain-hardened, or H19, temper. Each wire was measured for its electrical conductivity along with its tensile properties. Also, each was measured for its predicted 10-year creep level in accordance with a procedure whereby individual lengths of wire are loaded with a dead weight load sufficient to produce a stress in the wire of 10,000 p.s.i. The temperature is maintained at 75° F. during the procedure. Changes in length over a gauge length of 100 inches are measured at intervals of time. Data obtained between 100 and 1000 hours are analyzed and the average creep rate determined by a least squares method. The creep strains and strain rates so determined permit estimation of the amount of creep strain to be expected in 10 years under these conditions. This procedure is an accepted means of predicting creep, especially for comparison purposes.

TABLE I

| Example | Mg | Cu | Fe | Si | B | Other | T.S., K s.i. | Y.S., K s.i. | Elongation, percent in 10 in. | Electrical conductivity, percent IACS | Creep, μin./in. in 10 yrs. at 10 K s.i. |
|---|---|---|---|---|---|---|---|---|---|---|---|
| 1 (EC) | .00 | .00 | .17 | .06 | .02 | | 28.3 | 24.8 | 2.2 | 62.4 | 1,490 |
| 2 (5005) | .72 | .00 | .22 | .11 | .02 | | 39.5 | 34.3 | 2.3 | 55.4 | 690 |
| 3* | .05 | .00 | .17 | .06 | .013 | | 30.9 | 26.3 | 2.4 | 62.0 | 1,095 |
| 4* | .11 | .00 | .16 | .06 | .017 | | 33.0 | 27.4 | 2.3 | 61.3 | 1,035 |
| 5* | .29 | .00 | .21 | .06 | .02 | | 34.2 | 29.0 | 2.8 | 59.2 | 915 |
| 6 | .09 | .00 | .29 | .07 | .014 | | 32.4 | 26.4 | 2.7 | 60.9 | 1,480 |
| 7 | .09 | .00 | .76 | .06 | .017 | | 35.2 | 29.7 | 1.8 | 59.9 | 2,770 |
| 8 | .25 | .00 | .42 | .07 | .01 | | 32.9 | 27.5 | 2.8 | 59.6 | 1,480 |
| 9 | .12 | .00 | .19 | .06 | .012 | .58 Ni | 34.3 | 27.9 | 2.8 | 60.3 | 3,240 |
| 10 | .29 | .00 | .21 | .06 | .02 | .09 Ni | 33.7 | 28.1 | 2.5 | 59.2 | 2,150 |
| 11* | .09 | .41 | .20 | .06 | .015 | | 32.8 | 30.2 | 2.9 | 59.0 | 530 |
| 12* | .09 | .30 | .20 | .05 | .018 | | 33.9 | 30.8 | 2.8 | 59.7 | 570 |
| 13* | .14 | .37 | .21 | .05 | .019 | | 34.4 | 31.5 | 2.1 | 59.0 | 425 |
| 14* | .13 | .31 | .21 | .05 | .017 | | 33.7 | 30.9 | 2.7 | 59.1 | 410 |
| 15* | .16 | .25 | .21 | .05 | .017 | | 35.0 | 31.6 | 2.2 | 59.1 | 370 |
| 16* | .20 | .26 | .21 | .05 | .018 | | 32.4 | 29.3 | 3.1 | 59.0 | 450 |
| 17* | .10 | .40 | .25 | .05 | .016 | | 32.6 | 29.9 | 2.6 | 59.2 | 490 |
| 18* | .17 | .31 | .25 | .05 | .017 | | 33.2 | 30.7 | 3.1 | 59.2 | 520 |
| 19 | .00 | .002 | .15 | .05 | .01 | | 29.2 | 26.4 | 1.2 | 62.4 | 1,610 |
| 20* | .25 | .01 | .17 | .05 | .02 | | 33.6 | 28.8 | 1.9 | 60.1 | 660 |
| 21* | .12 | .41 | .14 | .05 | .02 | | 34.4 | 29.4 | 2.6 | 59.0 | 160 |

The results of the comparisons are set out in Table I wherein the compositions marked with an asterisk are in accordance with the invention and the others are not. Referring to the table, Examples 1 and 2, respectively, cover EC and alloy 5005 conductor wire. It is readily apparent that the EC wire exhibits the best electrical conductivity, 62.4% IACS, but is marked by a creep level of almost 1500 microinches. The 5005 alloy exhibits much improved creep resistance, a creep level of just under 700 microinches but is marked by a rather low conductivity level of only 55.4%.

Examples 3 to 5 fall within the embodiment where copper may be absent and generally limited to not over 0.05%. It is apparent that, for the entire range of magnesium contents contemplated by the first embodiment of the invention, the electrical conductivity is always over 59% IACS and generally over 59.5%. Where the creep level is over 1000, but still under 1100, the conductivity is over 61%. This is accomplished by limiting the magnesium content to 0.13% or below. The creep levels never exceed 1100 microinches so that the first embodiment of the invention, typified by Examples 3 to 5, represents a marked improvement over the existing EC and 5005 alloy materials in combining low creep with high conductivity. This is, while the creep levels are not as low as that of 5005 alloy, they are much better than EC metal. Further, the conductivity levels are much better than 5005 alloy and even closely approach those of the EC metal.

Examples 6 through 10 demonstrate that compositions just outside those of the invention exhibit marked deficiencies in the areas of concern here so as to emphasize the importance of carefully following the composition limits described herein. In Example 6, it can be seen that exceeding the limit for iron by just 0.04% results in a marked increase in the creep rate which approaches the level associated with EC metal. Examples 7 and 8 also verify this point. In Example 9, it is apparent that the addition of 0.58% Ni to a composition very much like that of Example 4 results in a catastrophic deterioration of creep strength. Example 10 illustrates that the presence of a mere 0.09% Ni in a composition much like that in Example 5 drastically deteriorates creep strength.

Examples 11 through 18 clearly demonstrate that wire within the second embodiment of the invention, which contemplates an alloy containing 0.04 to 0.25% Mg. and 0.2 to 0.5% Cu, exhibits markedly improved resistance to creep along with very good electrical conductivity. The resistance to creep is actually better than that measured for 5005 metal which is of a particular significance in that such is achieved while maintaining a level of electrical conductivity which is much higher than that associated with 5005 metal. While the conductivity is not quite as good as that achieved in the first embodiment of the invention (illustrated in Examples 3 through 5) the conductivity level for the second embodiment of the invention always exceeds 58.5% IACS and more often exceeds 59% as shown in the table for Examples 11 and through 18. The creep level for these examples, it can be seen, is always under 600 microinches and often under 500 microinches as verified by Examples 13 through 17.

In the case of the smaller (0.080") diameter wire it was observed that with EC alloy, Example 19, the amount of creep was greater than was observed with the 0.149 inch diameter EC wire, namely 1610 microinches versus 1490 microinches for Example 1. Example 20, representing the first embodiment of the invention, exhibited good tensile strength with a high electrical conductivity, 60.1% IACS, and resistance to creep even better, 660 microinches, than was observed with 0.149 inch diameter wire for the first embodiment of the invention as can be seen by comparing with the Example 5 creep level of 915 microinches. Example 21, representing the second embodiment of the invention, disclosed a very favorable combination of high strength and an electrical conductivity of 59 IACS together with very high resistance to creep, 160 microinches per inch.

In viewing the table, it is worth noting that there is little direct correlation between tensile properites and creep properties in that wire compositions in accordance with the invention have tensile properties which are not particularly striking in comparison with EC and especially with 5005 alloy. However, the unique combination of high electrical conductivity along with very much improved resistance to creep, which characterize the electrical conductor in accordance with the invention, speak for themselves in demonstrating the improvement derived from the practice of the invention.

While the invention is described in its more simple embodiments, referring particularly to the illustrative examples comparing single wires, the practice of the invention contemplates more complex embodiments. For instance, conductor wire in accordance with the invention may be employed in stranded conductor cable comprising a number of strands of the improved wire along with strands of coated high strength steel or of another aluminum material such as alloy 6201–T81 (ASTM Standard Specification B398–67). By such measures the total strength of the composite cable can be optimized for the various types of transmission line arrangement.

What is claimed is:

1. A method of producing electrical conductor wire comprising:
   (1) providing a body composed of an aluminum base alloy consisting essentially of 0.04 to 0.3% Mg, up to 0.5% Cu, the balance being aluminum with the following maximum limits on other elements: 0.10% Si, 0.25% Fe, 0.04% B, 0.04% Ga, 0.03% Zn, 0.01% Sn, 0.01% Ni, 0.005% Mn, 0.005% Cr, 0.003% Ti, 0.003% V and 0.003% Zr, the combined total of all elements other than Al, Mg and Cu not exceeding 0.4%,
   (2) fabricating said body into said conductor wire using metal working procedures which impart thereto a severely strain-hardened temper, equivalent to a cold reduction constituting at least 90% of the cross sectional area of the body before being subjected to said metal working procedures, said wire being characterized in said temper so produced by a minimum electrical conductivity of 58.5% IACS and a maximum creep level of 1100 microinches per inch of length in 10 years under a stress of 10,000 p.s.i.

2. The method according to claim 1 wherein said metal working procedures include cold reductions amounting to at least 90%.

3. Electrical conductor wire composed of an aluminum alloy consisting essentially of 0.04 to 0.3% Mg, up to 0.5% Cu, the balance being aluminum with the following maximum limits on other elements: 0.10% Si, 0.25% Fe, 0.04% B, 0.04% Ga, 0.03% Zn, 0.01% Sn, 0.01% Ni, 0.005% Mn, 0.005% Cr, 0.003%, Ti, 0.003% V and 0.003% Zr, the combined total of all elements other than Al, Mg and Cu not exceeding 0.4%, said wire being in a severely strain-hardened temper as the result of metal working procedures which impart thereto strain-hardening effects equivalent to a cold reduction constituting at least 90% of the cross sectional area thereof prior to said working procedures, said conductor wire in said temper so produced exhibiting a minimum electrical conductivity of 58.5% IACS and a maximum creep level of 1100 microinches per inch of length in 10 years under a stress of 10,000 p.s.i.

4. The conductor wire according to claim 3 wherein said alloy contains not more than 0.05% Cu and the conductor wire exhibits a minimum electrical conductivity of 59.5% IACS.

5. The conductor wire according to claim 4 wherein said alloy contains from 0.04 to 0.13% Mg and the conductor wire exhibits a minimum electrical conductivity of 61% IACS.

6. The product according to claim 3 wherein said metal working procedures include cold reductions amounting to at least 90%.

7. Electrical conductor wire composed of an aluminum alloy consisting essentially of 0.04 to 0.25% Mg, 0.2 to 0.5% Cu, the ratio of percent Cu to percent Mg ranging from 1 to 5 and the percent Mg plus 0.5 times the percent Cu being not greater than 0.37, the balance being aluminum with the following maximum limits on other elements: 0.10% Si, 0.25% Fe, 0.04% B, 0.04% Ga, 0.03% Zn, 0.01% Sn, 0.01% Ni, 0.005% Mn, 0.005% Cr, 0.003% Ti, 0.003% V and 0.003% Zr, the combined total of all elements other than Al, Mg and Cu not exceeding 0.4%, said wire being in a severely strain-hardened temper as the result of metal working procedures which impart thereto strain-hardening effects equivalent to a cold reduction constituting at least 90% of the cross sectional area thereof prior to said working procedures, said conductor wire in said temper so produced exhibiting a minimum electrical conductivity of 58.5% IACS and a maximum creep level of 600 microinches per inch of length in 10 years under a stress of 10,000 p.s.i.

8. A multistranded conductor cable comprising a plurality of conductor wires in accordance with claim 3.

References Cited

UNITED STATES PATENTS

| | | | |
|---|---|---|---|
| 2,572,562 | 10/1951 | Harrington | 148—159 |
| 1,704,253 | 3/1929 | Hybinette | 148—12.7 |
| 1,921,089 | 8/1933 | Meissner | 148—12.7 |
| 3,234,054 | 2/1966 | Sperry | 148—11.5 A |
| 3,241,953 | 3/1966 | Pryor et al. | 148—11.5 A |
| 3,359,141 | 12/1967 | Mercier | 148—11.5 A |
| 3,418,177 | 12/1968 | Pryor | 148—11.5 A |
| 3,464,866 | 9/1969 | Pryor | 148—11.5 A |

OTHER REFERENCES

"Cond-Al"—a Tailor-Made Aluminum Alloy of High Creep Strength and Conductivity; Metal Progress, May 1953; Harrington et al., pp. 90–93.

L. DEWAYE RUTLEDGE, Primary Examiner

W. W. STALLARD, Assistant Examiner

U.S. Cl. X.R.

148—32